May 31, 1966 J. E. R. LEMIEUX 3,254,181

MOUNTING HAVING SHORT CIRCUIT MEANS FOR COMMUNICATION LINE PROTECTOR

Filed Jan. 7, 1964 3 Sheets-Sheet 1

May 31, 1966 J. E. R. LEMIEUX 3,254,181

MOUNTING HAVING SHORT CIRCUIT MEANS FOR COMMUNICATION LINE PROTECTOR

Filed Jan. 7, 1964 3 Sheets-Sheet 3

United States Patent Office 3,254,181
Patented May 31, 1966

3,254,181

MOUNTING HAVING SHORT CIRCUIT MEANS FOR COMMUNICATION LINE PROTECTOR

Joseph E. R. Lemieux, Laval Islands, Quebec, Canada, assignor to The Bell Telephone Company of Canada, Montreal, Quebec, Canada Filed Jan. 7, 1964, Ser. No. 336,219
9 Claims. (Cl. 200—115)

This invention relates to improvements in mounting assemblies for gas-filled protectors of the type used in connection with communication lines.

It is necessary to protect telephone, control, and like communication lines against voltages induced in them by lightning flashes and switching or fault surges in adjacent power lines. Such voltages often exceed the normal operating voltages of the line, and, if protection were not provided, there would be potential danger to personnel as well as risk of damage to valuable telephone and other communication equipment.

For these reasons there have come into conventional use devices known as protectors (also known as spark gap devices), which are connected between the two lines of a telephone pair, or between each line and ground, or between all three of these points. The protector is designed to present an open circuit at normal operating voltages, but to provide a low impedance path for conducting to ground undesired currents at voltages above those that the line is required to encounter during normal operation.

One type of such protector is the so-called gas-filled protector, one form of which is illustrated in U.S. Patent Number 2,620,453 issued December 2, 1952 to N. C. Beese et al. A well known commercial form of such a protector (illustrated at 10 in the drawings accompanying this application) consists of a three-electrode device of generally elongated cylindrical shape comprising an outer metal tube disposed centrally of the device and rigidly mechanically connected by insulating ceramic spacers to a pair of metallic end caps. From each of the end caps a small diameter cylindrical electrode projects towards the center of the device along the longitudinal axis thereof. The free ends of these two electrodes thus extend inwardly from the end caps to face each other at the center of the device across a gap, the length of which is accurately predetermined. Such inner electrodes are also spaced a carefully predetermined distance from the centrally located, outer metal tube which forms the third electrode. The device is filled with a suitable inert gas, such as argon, at a convenient pressure, typically about a third of an atmosphere. This type of protector is designed to be mounted with the central outer electrode connected to ground and each of the end caps connected to a respective line of a telephone pair. On the occurrence of an overvoltage in either line, relative to ground, and/or across the lines, one or more of the gaps between the inner electrodes and the grounded outer electrode and between the inner electrodes themselves will break down and temporarily act as a low impedance between the lines and ground. Upon the disappearance of the overvoltage, the device will recover its non-conducting condition and again present a high impedance to the lines and between the lines and ground. A gas-filled protector can normally withstand a large number of such operations without any significant change to its performance characteristics, a feature which makes the gas-filled protector superior in many respects to the other principal type of protector, the carbon-block protector, which latter has to be replaced frequently, because of its tendency to deteriorate after a number of operations.

Numerous variations have been proposed from time to time in the details of construction of gas-filled protectors. Some protectors are of the two electrode type having one grounding electrode and only one line electrode. A telephone pair is then protected by two such protectors connected one between each respective line and ground. But the more modern form of gass-filled protector is the three-electrode device. The present invention, insorfar as it is concerned with an improved mounting for a gass-filled protector, is not concerned with such variations in the internal structure of the protector itself. Suffice to say that, while the preferred froms of mounting described specifically below are illustrated in use with one particular construction of protector, the invention in its broad aspects includes mountings that are used with (and which may be specially dimensioned to cooperate with) any form of gas-filled protector that includes at least two electrodes, an electrode serving as a grounding connection, and at least one electrode for connection to a line conductor.

Consideration must also be given to the performance of protectors under very heavy current conditions. If an overvoltage persists, the current flowing through the protector may be sufficient to destroy it, or seriously damage it. The question then arises of the effect that this damage or destruction of the protector will have on its function as a protector. Undoubtedly the protector will require replacement as soon as possible, but, in the meantime, it is important that the device should "fail safe," in the sense that, in failing, it should be sure to connect the line or lines that it is protecting to ground. It should under no conditions fail open, leaving the line or lines unprotected.

Gas-filled protectors of the type described above have been designed with this object in view. Theoretically, when a gass-filled protector is so heated by excess current that its metal parts soften or melt, the outer tube will collapse around the inner electrode or electrodes and establish a permanent short circuit from the inner electrodes to ground. Experience has shown, however, that this theoretically inherent fail safe feature is not entirely dependable in practice. Completely reliable operation is so vital in a protector that a design which will fail safe most of the time is not good enough. For this reason the adoption of the gas-filled type of protector has not been as universal as its otherwise very favourable operating characteristics would recommend. The carbon-block type of protector, although less desirable in some of its features (mainly durability), has better inherent fail safe characteristics.

The object of the present invention is to provide a novel mounting for a gas-filled protector that will compensate for this disadvantage of this type of protector by incorporating the fail safe characteristics in the mounting itself, and by making such fail safe function of the mounting inherently reliable.

A further object of the invention is to provide a combination of protector and mounting as a novel assembly.

Three assemblies of mounting and protector constructed and arranged in accordance with the present invention are illustrated in the accompanying drawings. These constructions are intended as examples only of the invention, and not as limiting to its scope which is defined in the appended claims.

Figure 1:
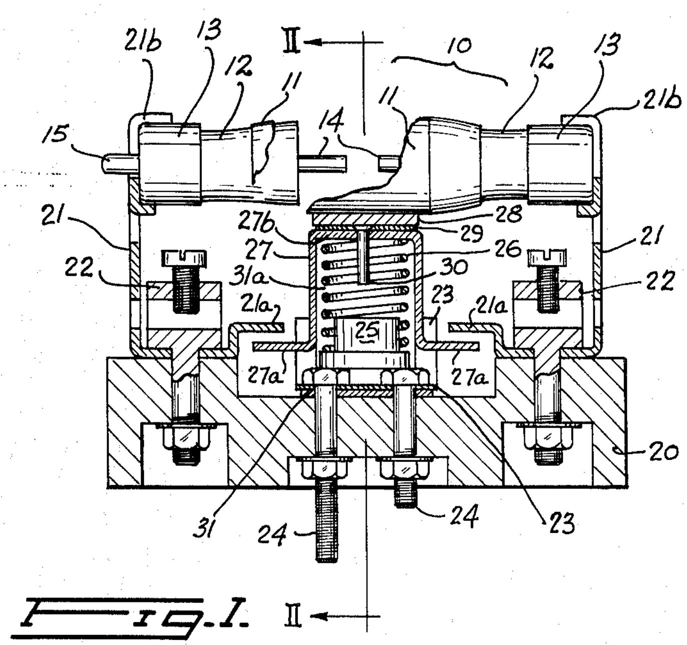
FIGURE 1 is a side, partly sectioned view of a first mounting with a gas-filled protector (shown partly broken away) mounted therein.

The gas-filled protector 10 seen in the drawings, although not novel in itself, forms part of the combination of the invention and will therefore be briefly described. It includes a centrally located, outer, tubular grounding electrode 11 structurally connected by insulating ceramic spacers 12 to end caps 13 from which inner electrodes 14 project towards the centre of the device. The protector 10 is evacuated, filled to a sub-atmosphereic pressure with an inert gas, and finally sealed by a tit 15 which communicates with the interior of the device.

Figure 2:
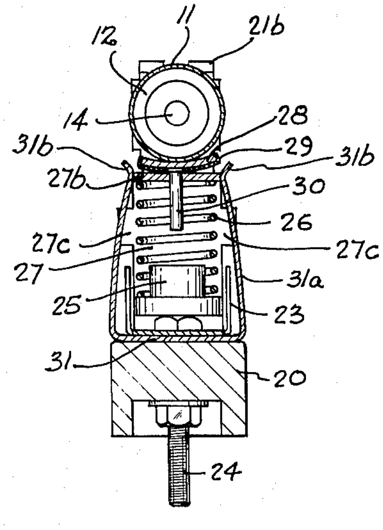
FIGURE 2 is a section on the line II—II in FIGURE 1.
Figure 3:
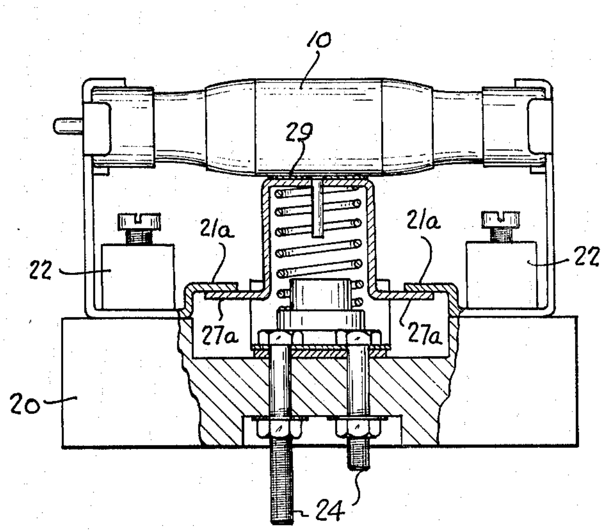
FIGURE 3 is a view corresponding to FIGURE 1 showing the parts in "fail safe" condition.

The mounting of FIGURES 1 to 3 comprises an elongated insulating base 20, to the respective ends of which are secured a pair of resilient metallic clips 21 by a pair of line terminals 22. Clips 21 each include inwardly projecting contact portions 21*a*. Between the two terminals 22, to which the two lines of a telephone pair will be connected, there is mounted in the base 20 a central terminal 23 which will be externally connected to ground. Terminal 23 is secured by bolts 24, and bearing on the heads of bolts 24 is a support 25 from which a compressed coil spring 26 extends upwardly to engage the underside of a central portion 27*b* of an inverted channel-shape shorting bar 27. The upper surface of such central portion 27*b* supports an alloy pellet 28 by means of a metal retaining clip 29 mounted on a locating pin 30 extending through the central bar portion 27*b*. The pellet 28 bears upwardly against the outer electrode 11 of the protector 10, the end caps 13 of which are held firmly in clipped-in engagement by the upper ends 21*b* of the clips 21. The presence of the protector 10 prevents upward movement of the shorting bar 27 under the urging of spring 26 and thus holds contact portions 27*a* thereof spaced apart from the contact portions 21*a* of clips 21.

The spring assembly is contained between a pair of side plates 31*a* of a metallic U-shaped clip 31 secured beneath the terminal 23. The upper edges 31*b* of plates 31*a* bear against the edges of retaining clip 29 and/or against the edges of central portion 27*b* of the shorting bar 27. Thus, through the alloy pellet 28, clip 31 establishes electrical contact between the outer electrode 11 of the protector 10 and the grounded terminal 23. A parallel grounding circuit may exist through the spring 26 depending on the material of such spring. Ears 27*c* project from the sides of bar 27 to engage slidingly the edges of plates 31*a* and help to retain the parts as a coherent assembly.

The air gaps represented by the contact portions 21*a*, 27*a* will normally be too wide to anticipate the function of the protector. The protector will operate and provide a circuit to ground at a line over-voltage lower than the voltage required to break down these air gaps. Nevertheless these air gaps provide some back-up protection for excessive voltage surges. But this is not the prime function of contact portions 21*a*· 27*a*.

Figure 5:
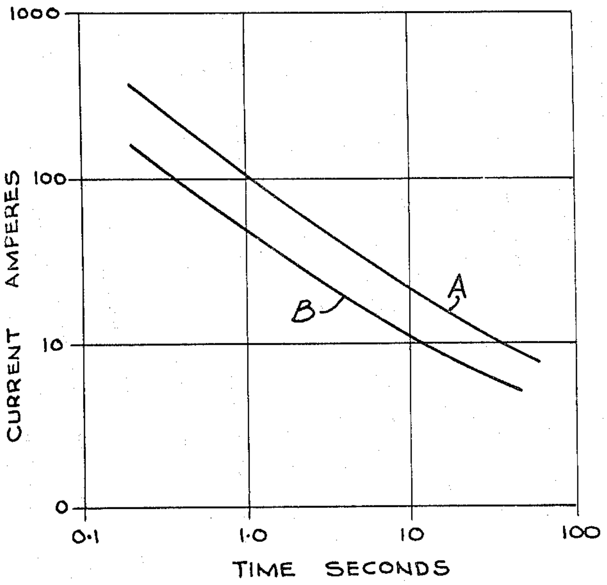
FIGURE 5 is a performance diagram.

Under heavy excess current conditions a large amount of heat is generated in the protector 10 and this heat is transmitted through the outer electrode 11 to melt the alloy pellet 28. Such heating, if sustained, would be sufficient soon to damage or destroy the protector 10. But it will not have an opportunity to do so, because of the operation of the fail safe mechanism. Conditions will be chosen so that the alloy pellet melts in advance of the point where a steadily building up temperature would damage the protector. This is demonstrated by FIGURE 5, curve A of which shows a plot of observations of the current in amps through the protector, against the time of duration of such current flow, required to cause damage to protectors like the protector 10 illustrated, in the absence of a fail safe mounting. Curve B is a plot of tests conducted on the performance of a fail safe mounting constructed according to the present invention. It will be observed that a uniform safety margin is obtained between curves A and B.

In FIGURE 3 it has been assumed that the protector 10 has been overheated to a point on curve B. As a result, the alloy pellet 28 has melted, and the spring 26 has forced the shorting bar 27 upwards to bring together the contact portions 21*a*, 27*a* and provide sure grounding of the line terminals 22, through the bar 27, clips 31 and terminal 23, regardless of the condition of the protector 10. Thus, even if the protector were to suffer damage and were to fail open, as far as its own structure is concerned, fail safe grounding of the line terminals 22 is assured by the mounting.

Figure 4:
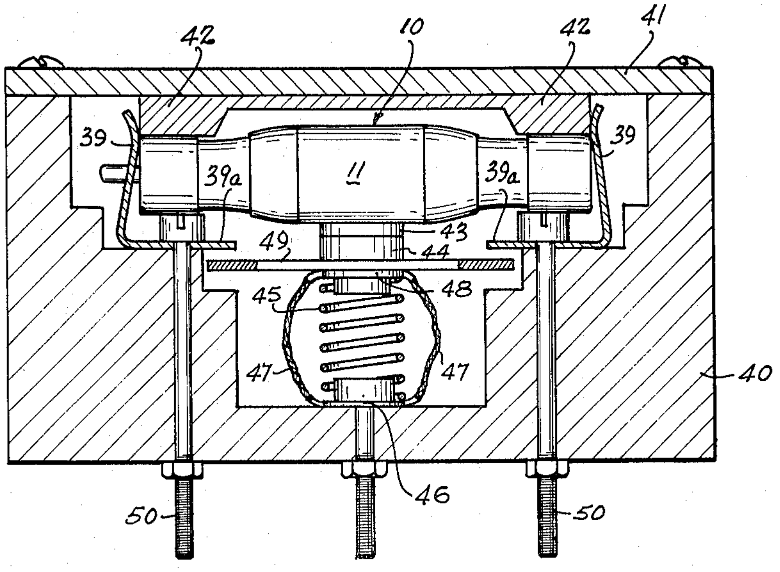
FIGURE 4 is a side, partly sectioned view of a second mounting with a gas-filled protector mounted therein.

FIGURE 4 shows an alternative construction in which a protector 10 is mounted by means of end clips 39 in an insulating housing 40 that includes a cover 41 having projections 42 located to hold the protector 10 firmly down in position. An alloy pellet 43 is secured to a metal disc 44 which is urged upwardly by a compressed coil spring 45 supported at its other end on a grounding terminal structure 46. Flexible metal straps 47 establish electrical connection between the terminal 46 and the disc 44 (and hence the electrode 11 of the protector 10), and the disc 44 has secured to it by a nut 48 a shorting bar 49 which, when released by melting of the alloy pellet 43, engages contact portions 39*a* of the clips 39 to connect both line terminals 50 electrically to the ground terminal 46. The operation of the construction of FIGURE 4 is basically the same as that of FIGURE 1. The housing 40 includes side walls (not shown) that limits the width of the cavity which the moving parts occupy and consequently ensure retention of these parts in their correct orientation.

Figures 6, 7, 8, 9:
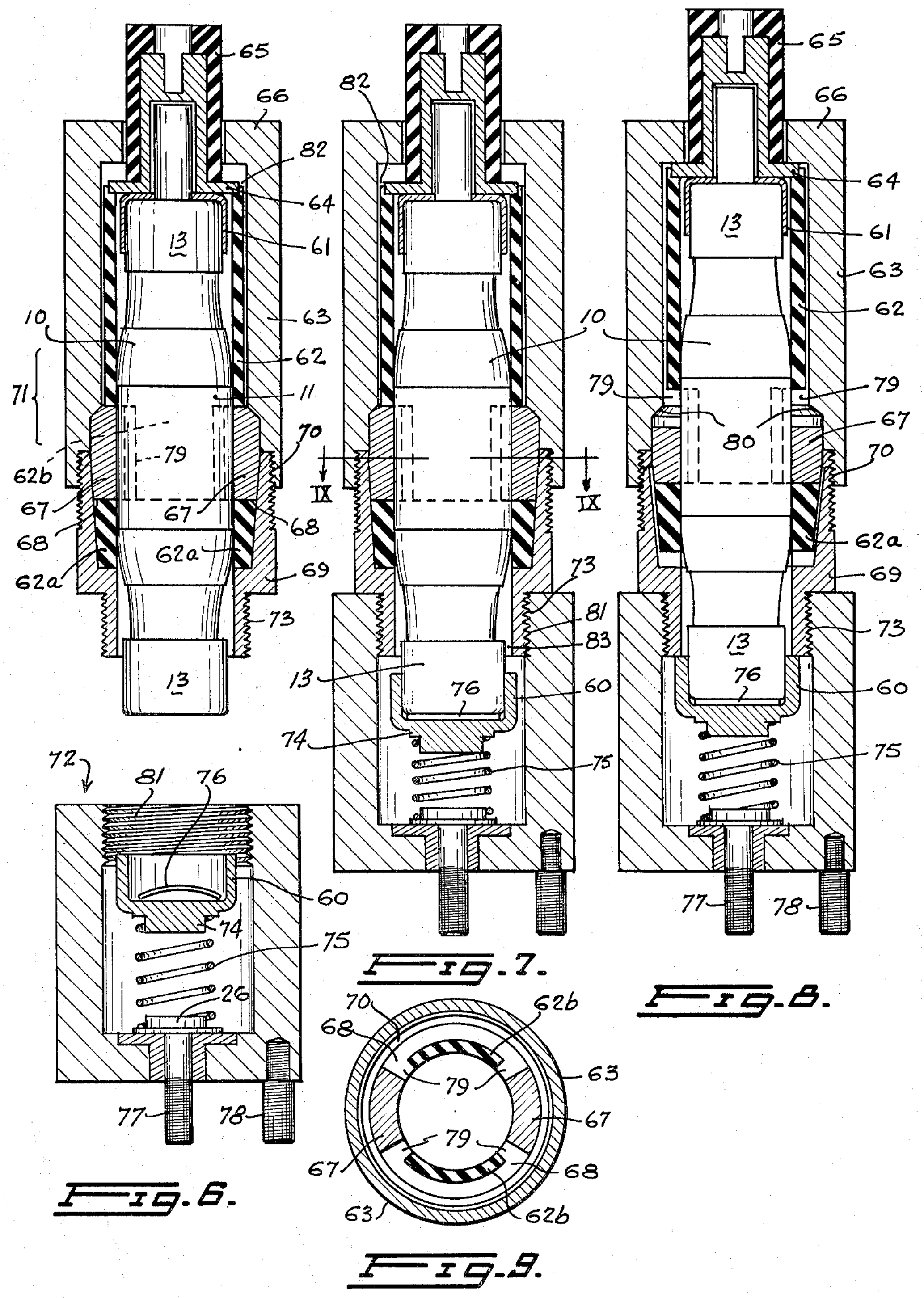
FIGURE 6 is a longitudinal section through a third construction shown partially disassembled.
FIGURE 7 is a similar view of the construction of FIGURE 6 fully assembled.
FIGURE 8 is a view corresponding to FIGURE 7 showing the parts in "fail safe" condition.
FIGURE 9 is a section on IX—IX in FIGURE 7.

A further construction is shown in FIGURES 6 to 9. Here the protector 10 is provided with a metallic cap 61 which fits over upper end cap 13. The protector is firmly mounted in an insulating sleeve 62 that can slide in a metal tube 63. At one end the sleeve 62 is secured to a metallic terminal 64 against which the cap 61 bears. An external jumper cable (not shown) will be engaged with the terminal 64 to establish electrical connection between one of the telephone lines and the upper electrode of the protector 10. The terminal 64 is surrounded by an insulating sleeve 65 except for an end aperture through which the jumper cable extends. The sleeve 65 slides in an in-turned annular flange 66 at the upper end of the tube 63. Two arcuate holes 79 are formed in opposite sides of the lower part of the sleeve 62 and a pair of alloy pellets 67 are placed one in each of these holes. The annular lower part 62*a* of the sleeve 62, which is situated below the pellets 67 and is connected to the sleeve 62 proper by portions 62*b*, is thicker than the remainder of the sleeve 62 and provides surfaces 68 that bear against the lower surfaces of the pellets 67. The upper surfaces 80 of the pellets 67 are chamfered and engage complementary surfaces on the inside of the tube 63. The lower parts are enclosed by an extension 69 of the tube 63 to which such extension is threaded at 70. The "capsule" 71 so formed is then mounted in a base 72 by engagement of further threads 73 on the tube extension 69 with a threaded hole 81 in such base (FIGURE 7). A cap 60 receives the lower end cap 13 and is supported by a metal disc 74 urged upwardly by a coil spring 75. At the same time a light leaf spring 76 between the caps 13 and 60 is resiliently flattened. The disc 74 and spring 75 provide an electrical path from the other end electrode of the protector to a line terminal 77. The ground connection is established from a ground terminal 78 through the base 72, tube extension 69 and pellets 67 to the central grounding electrode 11 of the protector.

While the cap 60 and its associated spring 76 are shown in FIGURE 6 as part of the base assembly, they may form part of the capsule 71.

The upward force generated by the spring 75 urges the protector 10 upwardly in the tube 63, but the protector is prevented from so moving by the terminal 64 against which it bears, since the terminal 64 is secured to the sleeve 62 and the lower part 62*a* of the sleeve 62 bears against the undersides of the pellets 67, which are, in turn, prevented from upward movement by the engagement of their upper surfaces 80 against the tube 63.

If the protector 10 is overheated by excess currents the alloy pellets 67 are melted. The pellets 67 do not completely fill the holes 79 in the sleeve 62 in the circumferential direction, and there is thus space for the molten alloy to flow into. This allows the axial dimension of the alloy to decrease and the sleeve 62 to move upwardly until the cap 60 engages the tube extension 73 in the manner shown in FIGURE 8 to short circuit the line terminal 77 to ground. The dimensions are so chosen that the other line terminal 64 should touch the grounded flange 66 at the same time, and the tolerances are so chosen that any minor deviation in this regard will be taken up by expansion of the leaf spring 76, thus ensuring adequate contact pressure between the terminal 64 and the flange 66. A fail safe condition has thus been achieved, with both line terminals shorted to ground regardless of the condition of the protector 10. In this letter embodiment of the invention the protector moves relatively to its casing, and parts which move with the protector, the cap 60 and terminal 64, form the shorting means. Auxiliary air gaps are formed at 82 and 83 in the FIGURE 7 condition.

In all the embodiments described, the material of which the alloy pellets are made will be a low melting point material and will be chosen to melt at a temperature determined by the protector characteristics. The tests illustrated in FIGURE 5 were carried out using conventional protectors manufactured by Associated Electrical Industries as Type 16, and a pellet of an alloy consisting of 52.5% bismuth, 32% lead and 15.5% tin which melts at 203° F. Other alloys that can be used include an eutectic fusible alloy comprised of 53% bismuth, 32% lead and 15% tin having a melting point of 205° F. and an eutectic fusible alloy comprised of 52% bismuth, 40% lead and 8% cadmium having a melting point of 180° F. Any fusible alloy would be suitable that has a melting point around 200° F. or somewhat less. The important consideration is that curve B should lie below curve A. It is convenient that the alloy be metallic and conducting, but not essential. The alloy can be non metallic and only semiconductive, provided an additional connection between the electrode 11 and ground is established.

As an alternative to locating the alloy pellet as part of the mounting of FIGURES 1 to 4, it can be fixed to the wall of the central electrode of the protector. Then, when a new protector is fitted, it would bring its own alloy pellet with it, and it would be unnecessary to fit a new pellet in the mounting. The essential requirement is that such alloy pellet, or "body of low melting point material" as it is broadly referred to in the claims, should exist somewhere in the assembly, either as part of the mounting, or as part of the protector. It is convenient that this body of material should be electrically conducting to aid in establishing the grounding of the central electrode of the protector during normal operation, but this is not essential from the viewpoint of the fail safe operations, since, once the spring has been released, grounding both line terminals by the shorting means is ensured.

As mentioned above, the invention is also applicable to use with a two-electrode protector. As in the three-electrode case, the alloy pellet will be located in close thermal contact with an area of the protector in which overheating will be pronounced, and a shorting bar or other shorting means will be released by melting of such pellet to short the line and ground terminals together.

I claim:

1. A fail safe mounting for a gas-filled protector of the type employed for the protection of telephone and like communication lines and having at least two electrodes; said mounting comprising:

(a) a base,
(b) at least two terminals mounted on said base,
(c) means for supporting a protector of the above described type on the base, said means including means mounted on said terminals for electrically connecting respective ones of said terminals to corresponding electrodes of said protector,
(d) shorting means movably mounted on the base to be movable in a path between a first position electrically connecting said terminals together in a positive grounding path across said electrodes and a second position electrically isolating said terminals from each other,
(e) resilient means acting between said shorting means and said base and urging said shorting means to said first position,
(f) a body of low melting point material mounted in thermal contact with a heat generating area of the protector,
(g) and means locating said body of material in the path of movement of the shorting means to hold said shorting means in said second position until melted by overheating of said protector area.

2. A fail safe protector assembly for the protection of telephone and like communication lines, comprising (a) a gas filled protector having at least two electrodes,
(b) a fixed structure supporting said protector,
(c) at least two terminals mounted on said fixed structure,
(d) means electrically connecting said terminals to respective ones of said electrodes of the protector,
(e) shorting means movably mounted on said fixed structure to be movable in a path between a first position electrically connecting said terminals together in a positive grounding path across said electrodes and a second position electrically isolating said terminals from each other,
(f) resilient means acting between said shorting means and said fixed structure uring said shorting means to said first position,
(g) a body of low melting point material mounted in thermal contact with a heat generating area of said protector,
(h) and means locating said body of material in the path of movement of the shorting means to hold said shorting means in said second position until melted by overheating of said protector area.

3. A fail safe protector assembly for the protection of telephone and like communication lines, comprising:

(a) a gas-filled protector in the form of an elongated cylindrical device having
  (i) a centrally located, outer, tubular electrode,
  (ii) a pair of end caps,
  (iii) electrical insulating means mechanically connecting said outer electrode and each of said end caps,
  (iv) and a pair of inner electrodes each extending axially along the device inwardly thereof towards each other from a respective end cap to form spark gaps with each other and with the outer electrode, (b) and a mounting supporting said protector, said mounting having a base, (v) a pair of line terminals mounted on said base and electrically isolated from each other, (vi) a ground terminal mounted on said base and electrically isolated from both said line terminals, (vii) a pair of conducting members each electrically connected to a respective line terminal, said conducting members engaging respective said end caps to establish electrical contact therewith and support the protector therebetween, (viii) a shorting member extending generally parallel to said protector, and means electrically connecting said shorting member to said ground terminal, (ix) means mounting said shorting member movably on said base for movement between two conditions, in one of which conditions opposite ends of said shorting member establish an electrical connection between said conducting members, and in the other of which positions said ends are out of contact with said conducting members, (x) a spring acting between said base and said shorting member and urging said shorting member to said one position, (xi) a body of low melting point metal, (xii) and means mounting said body between said shorting member and said outer electrode to prevent movement of said shorting member to said other position until release thereof by melting of said body.

4. A fail safe assembly for the protection of telephone and like communication lines, comprising:

(a) a gas-filled protector having at least one line electrode and a ground electrode constituting a spark gap, (b) a fixed structure including a ground terminal, (c) means mounting said protector in said fixed structure to be movable in a path relative thereto between one position in which said line electrode is electrically connected to said ground terminal and another position in which said line electrode is electrically isolated from said ground terminal, (d) resilient means mounted on said fixed structure and urging said protector to said one position, (e) a body of low melting point material and means mounting said body in the path of movement of said protector to hold said protector in said other position, said body being in close thermal contact with a heat generating area of said protector for melting of said body and release of said protector upon overheating of said protector.

5. A fail safe assembly for the protection of telephone and like communication lines, comprising:

(a) a gas-filled protector in the form of an elongated cylindrical device having (i) a centrally located, outer, tubular electrode, (ii) a pair of end caps, (iii) electrical insulating means mechanically connecting said outer electrode and each of said end caps, (iv) and a pair of inner electrodes each extending axially along the device inwardly thereof towards each other from a respective end cap to form spark gaps with each other and with the outer electrode, (b) a fixed structure including a ground terminal, (c) means mounting said protector in said fixed structure to be movable in a path relatively thereto between one position in which both said end caps are electrically connected to said ground terminal and another position in which said end caps are electrically isolated from said ground terminal.

(d) resilient means mounted on said fixed structure and urging said protector to said one position, (e) a body of low melting point material and means mounting said body in the path of movement of said protector to hold said protector in said other position, said body being in close thermal contact with a heat generating area of said protector for melting of said body and release of said protector upon overheating of said protector.

6. A fail safe assembly according to claim 5, wherein said body of material is electrically conducting and is positioned in electrical contact with the outer electrode of said protector and with said ground terminal to establish an electrical connection therebetween.

7. A fail safe assembly according to claim 5, wherein, in said other position, a part electrically common with each of said end caps provides an air gap to said ground terminal constituting back-up protection to the spark gaps of said protector.

8. A fail safe assembly for the protection of telephone and like communication lines, comprising:

(a) a gas-filled protector in the form of an elongated cylindrical device having (i) a centrally located, outer, tubular electrode, (ii) a pair of end caps, (iii) electrical insulating means mechanically connecting said outer electrode and each of said end caps, (iv) and a pair of inner electrodes each extending axially along the device. inwardly thereof towards each other from a respective end cap to form spark gaps with each other and with the outer electrode, (b) a fixed structure including a ground terminal, (c) means mounting said protector in said fixed structure including a member electrically connected to one of said end caps and resilient means in compression between said member and said one end cap, (d) said mounting means mounting said protector in said fixed structure to be movable in a path relatively thereto between one position in which said member and the other end cap are in electrical contact with said ground terminal and another position in which said member and said other end cap are electrically isolated from said ground terminal, (e) further resilient means mounted on said fixed structure and acting on said member to urge said protector to said one position, (f) a body of low melting point material and means mounting said body in the path of movement of said protector to hold said protector in said other position, said body being in close thermal contact with a heat generating area of said protector for melting of said body and release of said protector upon overheating of said protector.

9. A fail safe assembly for the protection of telephone and like communication lines, comprising:

(a) a metal tube, (b) a protector having at least one line electrode and a ground electrode, (c) said tube including means mounting said protector in said tube axially slidable in a path therein between two positions, in a first of which positions said line electrode is electrically isolated from said tube and in the second of which positions said line electrode is electrically connected to said tube, (d) a body of low melting point material, said means mounting said protector in said tube including means mounting said body in said tube in the path of movement of said protector to hold said protector in said first position in the tube, said body of material being in close thermal contact with a heat generating area of said protector, (e) and said tube including means for mounting the assembly in a base having resilient means to urge the protector towards said second position.

References Cited by the Examiner

UNITED STATES PATENTS

| | | | |
|---|---|---|---|
| 1,352,117 | 9/1920 | Davis | 200—115 |
| 2,504,804 | 5/1950 | Clarke | 317—61 X |

BERNARD A. GILHEANY, *Primary Examiner.*

H. A. LEWITTER, *Assistant Examiner.*